US007145697B1

(12) United States Patent
Sharma et al.

(10) Patent No.: US 7,145,697 B1
(45) Date of Patent: Dec. 5, 2006

(54) SHOW-THROUGH COMPENSATION APPARATUS AND METHOD

(75) Inventors: Gaurav Sharma, Webster, NY (US); Keith T. Knox, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 894 days.

(21) Appl. No.: 09/671,393

(22) Filed: Sep. 27, 2000

Related U.S. Application Data

(63) Continuation-in-part of application No. 09/200,984, filed on Nov. 30, 1998, now Pat. No. 6,288,798.

(51) Int. Cl.
*G06K 15/00* (2006.01)
*G06T 5/00* (2006.01)
*H04N 1/407* (2006.01)
*H04N 1/409* (2006.01)

(52) U.S. Cl. ............... 358/3.26; 358/3.06; 358/448; 382/274; 382/275

(58) Field of Classification Search ............... 358/3.26, 358/448, 474, 475, 1.9, 3.06; 382/274, 275
See application file for complete search history.

(56) References Cited

U.S. PATENT DOCUMENTS

| | | | | |
|---|---|---|---|---|
| 5,371,616 A | * | 12/1994 | Numakura et al. | 358/534 |
| 5,646,744 A | * | 7/1997 | Knox | 358/401 |
| 5,677,776 A | * | 10/1997 | Matsuda et al. | 358/475 |
| 5,808,756 A | * | 9/1998 | Matsuda | 358/474 |
| 5,832,137 A | * | 11/1998 | Knox | 382/275 |
| 5,973,792 A | * | 10/1999 | Matsuda | 358/448 |
| 6,101,283 A | * | 8/2000 | Knox | 382/254 |

OTHER PUBLICATIONS

"Advanced Engineering Electromagnetics", by Constantine Balanis, John Wiley & Sons, copyright 1989, pp. 220-236.*

"Restoration of Noisy Images Blurred by a Random Point Spread Function", by Mehmet Bilgen and Hsien-Sen Hung, IEEE International Symposium on Circuits and Systems, May 1-3, 1990, vol. 1, pp. 759-762.*

Gaurav Sharma, "Show-through Cancellation in Scans of Duplex Printed Documents", IEEE Transactions on Image Processing, Sep. 24, 1999.

Gaurav Sharma, "Cancellation of Show-through in Duplex Scanning", Proceedings International Conference on Image Processing, Sep. 10-13, 2000, Vancouver, Canada, vol. II, pp. II-609-612.

* cited by examiner

*Primary Examiner*—David Moore
*Assistant Examiner*—James A. Thompson
(74) *Attorney, Agent, or Firm*—Fay, Sharpe, Fagan, Minnich & McKee, LLP

(57) ABSTRACT

Apparatus and methods that adjust image data for show-through image information of an image on a front side of an image bearing substrate having image data on a back side and on an adjacent side of a backing substrate, e.g., the pages of a bound volume. Image data for a front side image, a back side image and an adjacent side image is obtained from an optical sensor that senses light reflected from the image bearing substrate. The image data is stored in a memory and is used to determine scanned density data and approximate absorbency data for the respective sides of the substrates. Show-through compensated density data for the front side image is computed by filtering the absorbency data for the back and adjacent side with a filter characteristic of the show-through characteristics of the image bearing substrate and subtracting this filtered absorbency data from the front side scanned density data. If required, the show-through compensated density data for the front, side image is converted into a show-through compensated reflectance image.

21 Claims, 6 Drawing Sheets

SHOW-THROUGH COMPENSATION APPARATUS AND METHOD

This application is a continuation-in-part of U.S. patent application Ser. No. 09/200,984; filed Nov. 30, 1998 now U.S. Pat. No. 6,288,798.

FIELD OF INVENTION

This invention is directed to document scanning and printing apparatus and methods that compensate for show-through of images from a back side of a translucent document and a document adjacent the translucent image when scanning the documents. It is particularly directed to the copying or scanning of such documents when they are bound together, e.g., pages of a book.

DESCRIPTION OF RELATED ART

When a user wishes to reproduce an image on an image bearing substrate [any document] or obtain an electronic version of the image on the document, the image is passed within a detection field of an optical sensor. The passing of the document image within the detection field of the optical sensor is termed "scanning" the document. The optical sensor detects light reflected from the surface of the document and obtains data representing the reflected light. The data obtained is an electronic representation of the images formed on the document, because the colors and shadings of the images reflect different amounts and wavelengths of light.

When a double-sided translucent image bearing substrate, having images on both sides of the image bearing substrate, is scanned, the electronic representation generated by scanning one side of the image bearing substrate will contain information from both sides of the image bearing substrate due to light passing through the image bearing substrate. The high contrast image information of the scanned side, or front, of the image bearing substrate will be combined with the low contrast image information from the back side of the image bearing substrate. This low contrast image information from the back side of the image bearing substrate is called "show-through" image information. Similarly, when such a translucent document is scanned while adjacent a similar document, e.g., copying pages from a bound book, then some text or images from the adjacent page may also "show-through". The elimination of residual signature in the scan of the back side and the adjacent document is the problem to be overcome by the subject development.

One way in which show-through image information is reduced is to place a black backing on the back side of the image bearing substrate during scanning. The light that passes through the image bearing substrate is absorbed by the black backing. Although there is a significant reduction of the show-through image information, there is a small residual low contrast image of the back side remaining in the scanned image due to light scattering off the back side of the image bearing substrate. This method is undesirable because with a black backing any perforations in the image bearing substrate and regions beyond the edges of the image bearing substrate appear as black regions in the scanned image. Additionally, trying to insert such a backing for book scanning is particularly inconvenient and undesirable.

Methods for compensation of show-through in the scanning of duplex printed documents have been previously been described in U.S. Pat. Nos. 5,832,137 and 6,101,283 to Knox. A description of the art can also be found in G. Sharma "Cancellation of Show-through in Duplex Scanning", Proceedings International Conference on Image Processing, Sep. 10–13, 2000, Vancouver, Canada, Vol. II, pp. II-609–612.

SUMMARY OF THE INVENTION

This invention provides apparatus and methods that compensate for show-through of images from a back side of a translucent image bearing substrate document and an adjacent side of another document disposed as a backing for the image document when reproducing the images.

Image reflectance data for a front side and back side of an image bearing substrate and the adjacent side of a backing substrate is obtained from an optical sensor that senses light reflected from the substrates. The image reflectance data is stored in a memory and is used to determine scanned density data for the front side and approximate effective absorbency data for the combination of the back side and the adjacent side of the substrates during the scanning.

In accordance with an imaging model proposed here, show-through compensated density data for the front side image is obtained by subtracting a low pass filtered version of the effective absorbency data for the combination of the back side and the adjacent side from the scanned density data for the front side. A point spread function for the low pass filter is estimated either statically or adaptively in accordance with standard linear prediction theory. The show-through compensated density data for the sides may be transformed back to show-through compensated reflectance data for each side.

The adjusted image data may then be stored in memory for later use when reproducing the image. In this manner, a reproduced image with no show-through may be obtained.

BRIEF DESCRIPTION OF THE DRAWINGS

Exemplary embodiments of the apparatus and the methods of this invention will be described with reference to the following figures, wherein like numerals designate like elements, and wherein.

DETAILED DESCRIPTION OF PREFERRED EMBODIMENTS

Figure 1:
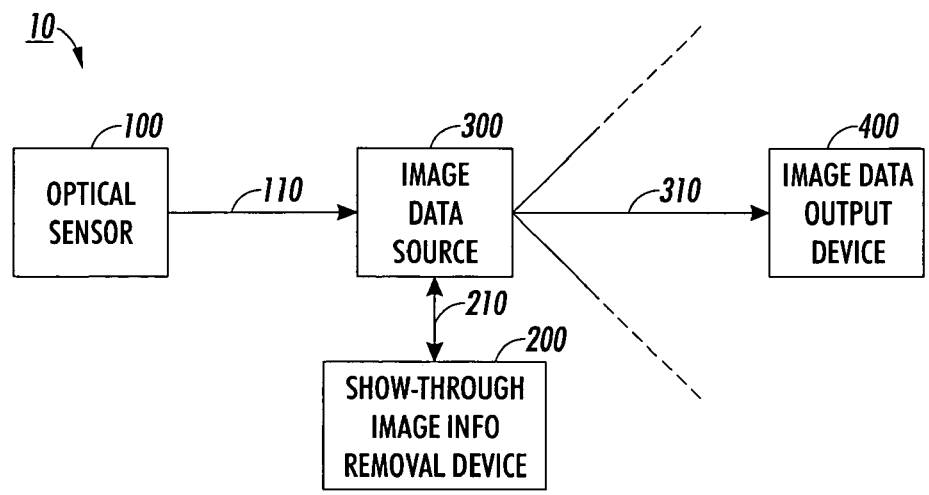
FIG. 1 is a functional block diagram of one exemplary embodiment of a show-through compensation system according to this invention.

FIG. 1 shows a functional block diagram of one exemplary embodiment of a show-through compensation system 10 according to this invention.

As shown in FIG. 1, the show-through compensation system 10 includes an optical sensor 100, a show-through image information removal device 200, an image data source 300, and an image data output device 400. These devices are coupled together via data communication links 110, 210 and 310, respectively. These communication links 110, 210 and 310 may be any type of communication link that permits the transmission of data. For example, the communication links may be direct serial or parallel connections, a local area network (LAN), a wide area network (WAN), an intranet, the Internet, circuit wirings and the like.

The optical sensor 100 is any type of device that detects light input and translates the light input into image data. For example, the optical sensor 100 may be a scanning array of photosensitive sensors such as CCDs or photodiodes which are controlled to sense light reflected from an image bearing substrate. The optical sensor 100 may be a single sensor or a plurality of sensors. Additionally, the optical sensor 100 may be deployed as a two-dimensional array, for instance the type used in a digital camera.

The optical sensor 100 provides image data to an image data source 300 via the communication link 110. The image data source 300 stores the image data in memory. The image data source 300 provides the image data to the show-through image information removal device 200 via the communication link 210 when show-through image information is to be removed. The show-through image information may be removed immediately after the image data is obtained or may be removed at some time after the image data is obtained. Furthermore, show-through image information may be removed when adjusted image data is to be sent to the image data output device 400.

The show-through image information removal device 200 adjusts the image data to compensate for the effects of show-through image information in the electronic image data generated by scanning the image bearing substrates. The image data is adjusted to generate adjusted image data, which is output to the image data source 300 via the communication link 210.

The image data source 300 is any type of device that is capable of receiving the adjusted image data and supplying image data to the image data output device 400. For example, the image data source 300 may be a computer, a microprocessor, a scanner processor, a disk drive, a tape drive, a hard disk, zip drive, CD-ROM drive, DVD drive, a network server, a print server, photocopying device or any other known or later developed device or system that is able to receive and provide image data. The image data source 300 may include a plurality of components including displays, user interfaces, memories, disk drives, and the like. For simplicity of the following description of the preferred embodiments, it will be assumed that the image data source 300 is a personal computer.

The image data source 300 stores the adjusted image data received from the show-through image information removal device 200 and provides the adjusted image data to the image data output device 400 over the communication link 310 when the image is to be output. The image output device 400 is any type of device that is capable of outputting an image. For example, the image output device 400 may be a laser printer, bubble jet printer, ink jet printer, photocopying machine, cathode ray tube (CRT), computer monitor, television, camera, or any other known or later developed device or system that is able to generate an image on a recording medium or display an image using image data or data generated from the image data. The image output device 400 generates an image based on the adjusted image data from the image data source 300. While FIG. 1 shows a single image output device 400, multiple image output devices 400 may be coupled to the image data source 300.

Any combination of the elements of FIG. 1 may be integrated into a single device. For example, the optical sensor 100, the show-through image information removal device 200, the image data source 300 and the image output device 400 may be contained within a single device such as a digital copier, a computer with a built-in printer, or any other integrated device that is capable of outputting an image. Similarly, the optical sensor 100 and the show-through image information removal device 200 may be integrated into a single device, such as in a scanner or the like.

Alternatively, the show-through image information removal device 200 and the image data source 300 may be combined into a separate integrated device attachable upstream of a stand-alone image output device 400. For example, the show-through image information removal device 200 and the image data source 300 may be an integrated device which interfaces with both the optical sensor 100 and one or more image output devices 400. For example, the show-through image information removal device 200 and the image data source 300 may be incorporated into a programmed general purpose computer, a network print server that manages printer data for a plurality of the same or different printer devices, and the like.

Furthermore, the show-through image information removal device 200 may be implemented as software executing on the optical sensor 100, the image data source 300 or the image output device 400. Other configurations of the elements shown in FIG. 1 may be used without departing from the spirit and scope of this invention.

The term "image", as used herein, refers to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in the image data source 300. The image may be a series of pixel values denoting the color, intensity, and/or any other known or later developed image property of the particular pixels that make up the image. Although most book scanning primarily involves black and white text, the invention is applicable to color images causing the undesired show-through effects. Extension to color on a per channel basis is straightforward from the exemplary embodiments discussed herein.

The optical sensor 100 detects light reflected from the image bearing substrate and translates the detected light into image data that is provided to image data source 300 and, in turn, to the show-through image information removal device 200. The show-through image information removal device 200 adjusts detected image data to remove any show-through image information and forwards the adjusted image data to the image data source 300. The image data source 300 stores the adjusted image data and outputs the adjusted image data to the image data output device 400 when the image is to be output.

When the optical sensor 100 is used to detect reflected light from the image bearing substrate, the image bearing substrates are scanned. For book scanning this comprises sides (pages) 1 and 2 of a book sheet and a side 3 comprising the facing page of an adjacent sheet. The first scan of the image bearing substrate is the front side (side 1) of the image bearing substrate, the second scan of the image bearing substrate is the back side (side 2) of the image bearing substrate, and the third scan is of the adjacent sheet (side 3) disposed as a backing to the substrate during the scan of the first side.

Thus, each scan of the image bearing substrates provides different image data corresponding to the image on the side of the image bearing substrate scanned with some show-through of the image on the opposite side of the image bearing substrate and the facing side of the adjacent backing substrate. The image data for the scanned sides of the image bearing substrates is provided by the image data source 300 to the show-through image information removal device 200.

Figure 2:
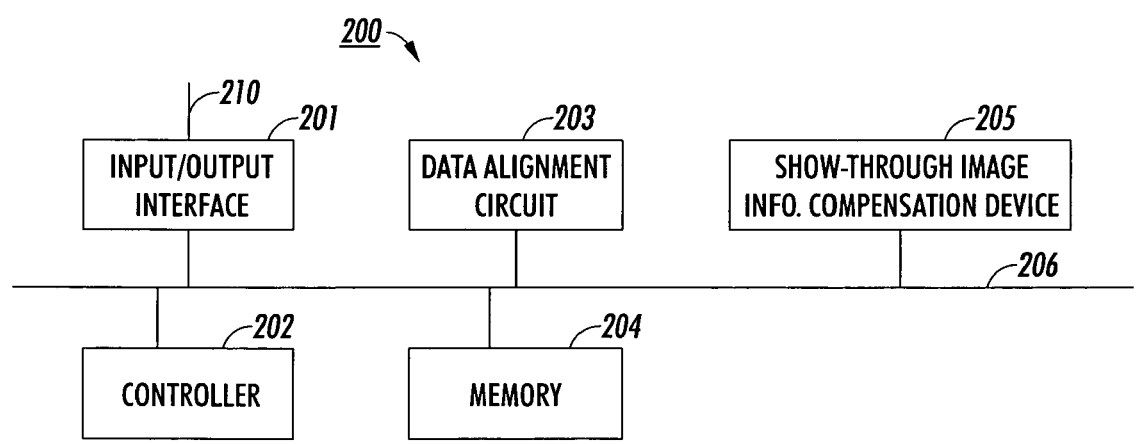
FIG. 2 is an exemplary functional block diagram of the show-through removing device of FIG. 1.

FIG. 2 is a block diagram of one exemplary embodiment of the show-through image information removal device 200 of FIG. 1. As shown in FIG. 2, the show-through image information removal device 200 includes an input/output interface 201, a controller 202, a data alignment circuit 203, a memory 204, and a show-through image information cancellation device 205. These elements are connected to one another via the control/data signal bus 206.

The image data is provided to the show-through image information removal device 200 by the image data source 300 via the communication link 110 and the input/output interface 201. The controller 202 causes the image data sent by the image data source 300 to be stored in the memory 204.

Once the image data is received from the image data source 300, the controller 202 instructs the data alignment circuit 203 to align the image data corresponding to the front side of the image bearing substrate with image data corresponding to the back side of the image bearing substrate and the facing side of the backing substrate. The back side image data will be reversed from the front side and facing side image data. Thus, when comparing information for two sides, the back side should be reversed so that the images will correspond.

After reversing, the front side image data should be aligned with the reversed back side image data and the facing side image data. Because the images are acquired at different times, or by different sensors, they are not necessarily scanned with the same spatial reference. Skew alignment, lateral shifts, and linear distortions of the images all may be required.

When the front side and the back side images are scanned using automatic feeding means, these adjustments can be determined from the geometry of the scanner, or by a calibration process which scans a test target and notes the spatial displacement of target features. The data alignment circuit 203 may also perform alignment determinations based on, for example, alignment marks on the image bearing substrates or an image bearing substrate support, edge detection, or any other known or later developed alignment method.

The alignment requirement may be relaxed through the choice of filters used to determine show-through cancellation values, as discussed in more detail below. Thus, exact alignment is not necessary to practicing the invention. However, some alignment is desirable to reduce error in the show-through cancellation determinations. Additionally, aligning the image data may be omitted and the data alignment circuit 203 omitted from the show-through image information removal device 200 without departing from the spirit and the scope of this invention.

In one exemplary embodiment, once the image data is aligned by the data alignment circuit 203, the show-through image information cancellation device 205 cancels the show-through image information from the image data. To cancel the show-through image information, scanned density and absorbency functions of the front, back, and facing side image layers are computed and show-through compensated densities of the images are computed by subtracting filtered absorbency data from the scanned density data. The resulting adjusted image data is stored in the memory 204 and then output to the image data source 300 via the input/output interface 201 and the communication link 210.

FIGS. 3–6 illustrate one exemplary method for adjusting image data to compensate for the show-through image information. The method described with reference to FIGS. 3–6 is only exemplary and is not meant to limit the invention to any one method. Rather, any method for compensating for the show-through image information that uses linearized density functions, or approximations thereof, to compensate for the show-through image information may be used without departing from the spirit and scope of this invention.

Figure 3:
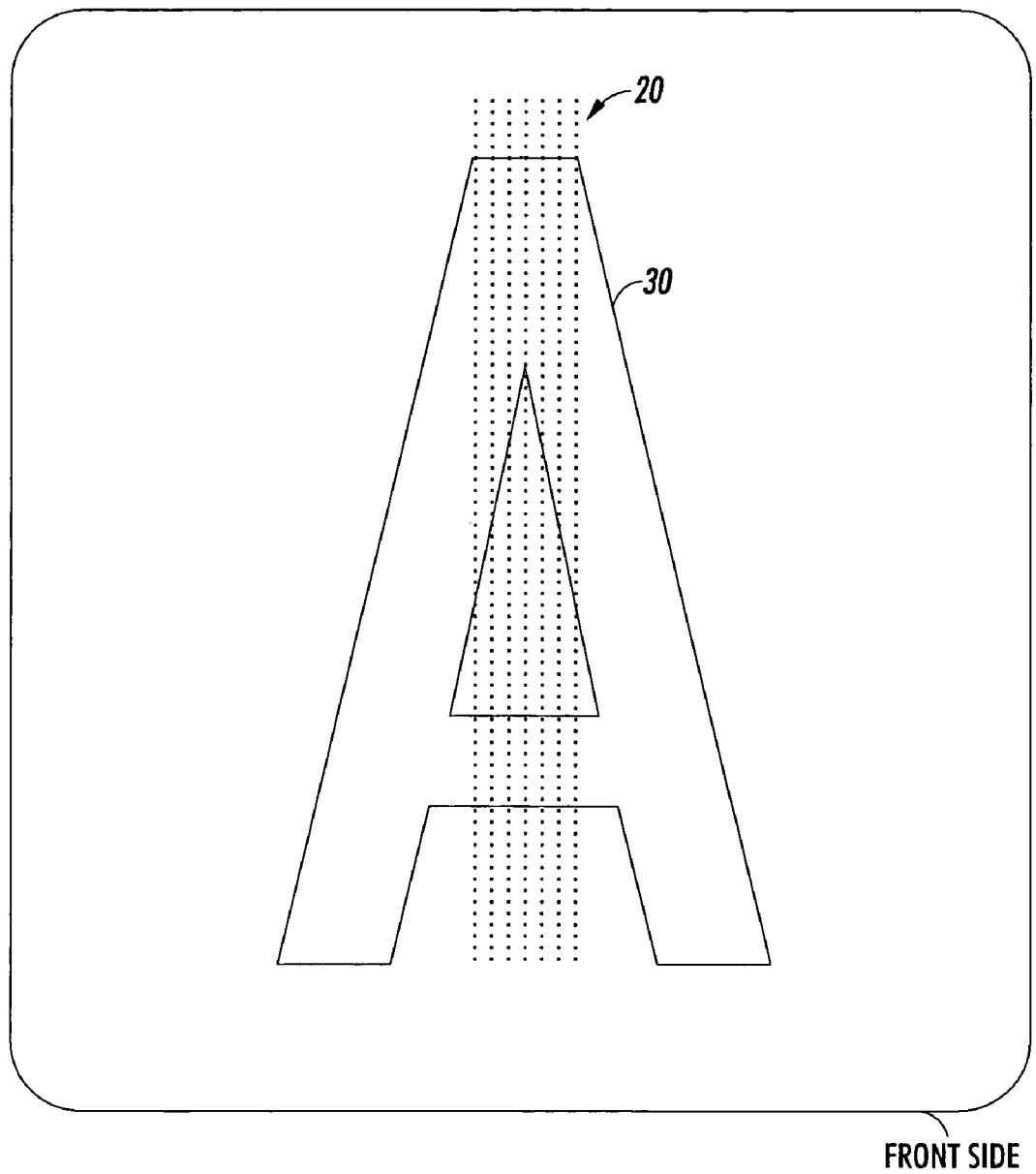
FIG. 3 is an exemplary diagram of an image on the front side of an image bearing substrate and an image on the back side "showing through" to the front side.

FIG. 3 shows the image data generated by scanning a front side of an image bearing substrate image that includes show-through image information of an image from the back side of the image bearing substrate. As can be seen from FIG. 3, the vertical line 20 shows through from the back side of the image bearing substrate and is present in the image data of the image 30 of the letter "A" generated from scanning the front side of the image bearing substrate.

Figure 4:
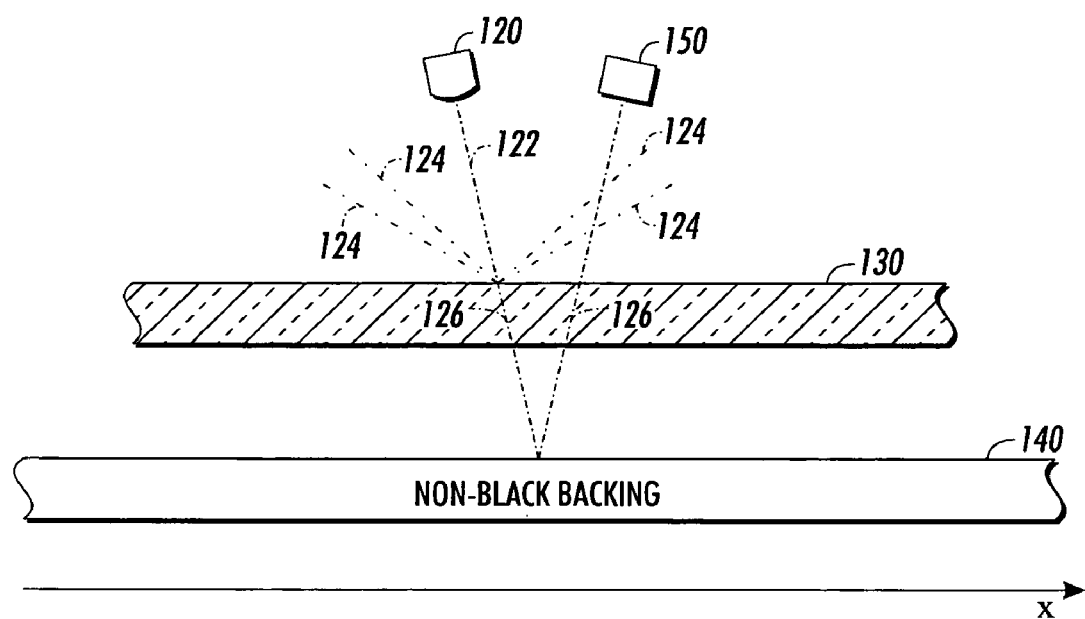
FIG. 4 illustrates the light paths that occur when scanning an image bearing substrate that does not have an image formed on it.

FIG. 4 illustrates the light paths that occur when scanning a translucent image bearing substrate using a non-black backing. In the example shown in FIG. 4, the translucent image bearing substrate does not have any images formed on it. Light 122 from a light source 120 is directed upon the translucent image bearing substrate 130. The light 122 from the light source 120 is incident on the front surface of the image bearing substrate 130. Portions 124 of the light 122 are scattered by the image bearing substrate 130. Other portions 126 of the light 122 are transmitted through the translucent image bearing substrate 130.

The portions 126 of the light 122 transmitted through the translucent image bearing substrate 130 are reflected by the non-black backing 140 back through the image bearing substrate 130 to an optical sensor 150. While FIG. 4 shows the reflected light 126 being reflected at a large angle, in actuality this angle is quite small and is considered to be zero. The figure is illustrative only and is not meant to be limiting in any way.

The reflectance $R_p^w$ detected by the optical sensor 150 may be represented as:

$$R_p^w = S_p + T_p^2 R_{back} \quad (1)$$

where:

$R_p^w$ is the reflectance detected by the optical sensor 150;

$S_p$ represents the fraction of portions 124 of the light 122 that are scattered;

$R_{back}$ represents the reflectance of the non-black backing; and $T_p$ represents the fraction of portions 126 of the light 122 that are transmitted through the image bearing substrate. The subscript p denotes a paper image bearing substrate and the superscript w in $R_p^w$ indicates that this is the reflectance for paper that is without print on either side (white). However, this invention is not limited to using paper, but may use any image bearing substrate. Thus, Eq. 1 shows that the reflectance $R_p^w$ detected by the optical sensor 150 is the sum of the fraction $S_p$ of the light 122 that is scattered and product of the backing reflectance $R_{back}$ and the square of the fraction $T_p$ of the light 122 transmitted through the paper is used to represent the amount of light that is transmitted through the paper image bearing substrate to the non-black backing, reflected therefrom and further transmitted back through the paper image bearing substrate to the optical sensor 150.

Figure 5:
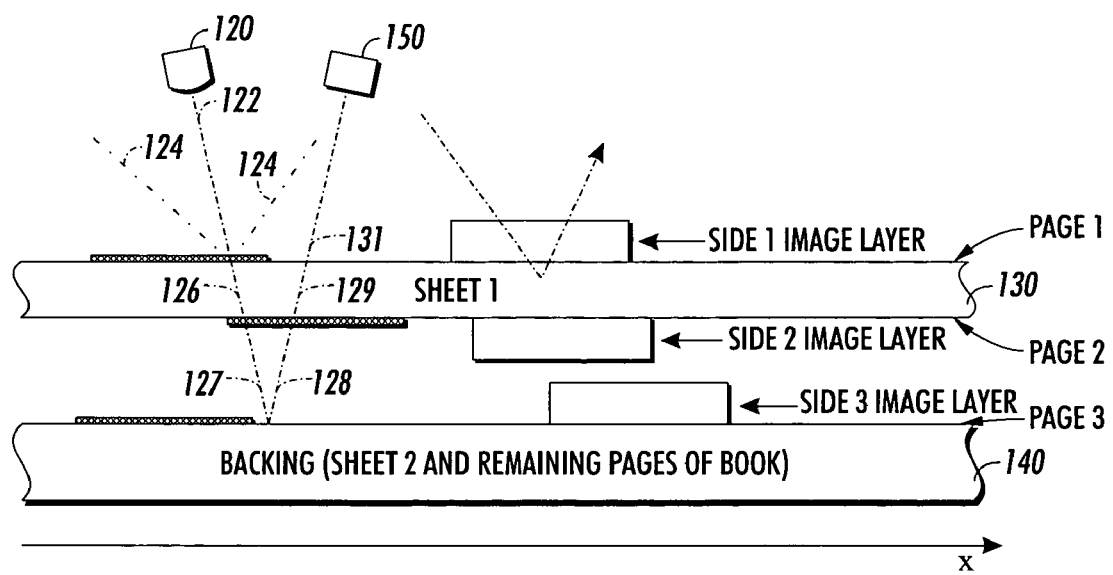
FIG. 5 illustrates the light paths that occur when scanning an image bearing substrate that has images on both the front side and the back side of the image bearing substrate, and an image on a backing sheet to the substrate, as in the scanning of the bound pages from a book.

FIG. 5 is a graphical diagram illustrating the light paths that occur when scanning a book wherein show-through image data results not only from the front and back sides of a single image bearing substrate, but that additional show-through image data occurs from a backing sheet adjacent to a scanned sheet. The following discussion assumes that the front and back sides images are black and white images. However, as will be apparent to one of ordinary skill in the art, similar light paths will occur with color or gray scale images.

As shown in FIG. 5, light 122 from the light source 120 is incident on the image bearing substrate (sheet 1) 130. Portions 124 of the light are scattered by the front side of the substrate 130. The remaining portion 126 of the light 122 is transmitted through the front side. The fractions of the light 122 that are scattered and that are transmitted depends on the characteristics of the image formed on the front side of the substrate 130.

The portion 126 of the light 122 transmitted through the front side of the image bearing substrate 130 is then transmitted through the back side of the image bearing substrate 130. Portion 127 of the light 122 that is transmitted through the back side of the image bearing substrate is dependent on the characteristics of the image on the back side of the image bearing substrate and the image bearing substrate itself.

The transmitted portion 127 of the light 122 is then reflected back from the backing 140 through the back and front sides of the image bearing substrate to the optical sensor 150. The portion 128 of the light 122 is dependent on the characteristics of the image on the adjacent side of the backing sheet 140. The portion 129 of the light 122 represents the portion of light that is transmitted through the back side of the substrate 130. Portion 129 may not be the same as portions 127 or 128 since some of the portion 127 will be absorbed by the backing 140 or may be scattered by the back side of the substrate 130. The portion 131 of the light 122 represents the portion of light passing through the front side of substrate 130. This portion 131 may not be the same as portion 129 due to, for example, the spread of light through the image bearing substrate 130.

In the preferred application of the subject invention, substrate 130 comprises pages 1 and 2 as the two sides of a duplex printed sheet of paper and the backing 140 is composed of an adjacent sheet and the following sheets (with page 3 on the top of the backing sheet 140.) A white paper substrate both transmits and scatters light. Let $S_p$ denote the fraction of light that is scattered upward by a sheet of paper and $T_p$ denote the fraction that is transmitted by a sheet of paper. The paper appears white in color because it scatters much more light than it transmits ($T_p << S_p$).

When page 1 is viewed from the top, as shown in FIG. 5, the image seen is attributable to the combination of the light rays that are scattered by the sheet of the paper and those that are transmitted through the sheet of paper, reflected back and retransmitted through the paper. The spatial reflectance profile corresponding to this view of page 1 (this is what is sensed by a scanner scanning page 1 with the remaining pages forming the backing) can be approximated as:

$$R_1^s(x,y) = T_1^2(x,y)S_p + T_1^2(x,y)T_p^2 T_2^2(x,y)R_3^s(x,y) \quad (2)$$

where x,y, denote the spatial coordinates, $T_1(x,y)$ is the transmittance of the image layer on page 1, $T_2(x,y)$ is the transmittance of the image layer on page 2, and $R_3^s(x,y)$ is the spatial reflectance profile of page 3 viewed from the top with subsequent pages of the book forming the backing. Note that the right hand side of Eq. 2 is the summation of two terms, the first of which corresponds to the part of the incident light that is scattered back by sheet 1 and the second of which corresponds to the part of light that is transmitted by sheet 1. Note also that the second term depends on the transmittance $T_2(x,y)$ of the back side image layer (on page 2) and the reflectance $R_3^s(x,y)$ of the pile of sheets forming the backing to sheet 1. This dependence of the (scanned) reflectance of page 1 on page 2 and the backing represents undesired show-through. The goal of show-through correction is to remove this undesired dependence.

Show-Through Corrected Image for Page 1

For consistency's sake, the term "show-through corrected image for page 1" refers to the image that would have been obtained if only the front face of page 1 were printed and there was no printing on the back side (page 2) or subsequent sheets of paper. Using this definition in Eq. 2 we can see that the reflectance for the show-through corrected image of page 1 is obtained by setting the transmittance of image layer 2 to unity ($T_2(x,y)=1$) and the reflectance of the "backing" to the reflectance for a pile of blank sheets ($R_3^s(x,y)=R_p^w$):

$$R_1(x,y) = T_1^2(x,y)\, S_p + T_1^2(x\ y)\, T_p^2 R_p^w \quad (3)$$

where $R_1(x,y)$ is the reflectance of the show-through corrected image of page 1 and $R_p^w$ is the reflectance of a pile of blank sheets (no printing anywhere). Note that alternate definitions of show-through corrected image may be used without impacting the following analysis or the applicability of the method.

The goal of show-through correction is to recover the reflectance $R_1(x,y)$.

Reflectance for a Pile of Blank Sheets

Consider a large pile of paper bearing no printing on any sheet. Let $R_p^w$ denote the reflectance of this large pile of paper. Since there is not printing on either side, we can use Eq. 2 with $T_1(x,y)=T_2(x,y)=1$ to obtain:

$$R_p^w = S_p + T_p^2 R_p^w \quad (4)$$

where the reflectance term corresponding to the backing has been replaced by $R_p^w$ because with a large pile of unprinted paper removing a sheet of paper will not change the reflectance in any significant way. Eq. 4 indicates that the reflectance of a large pile of unprinted paper can be computed from the scattering and reflection properties of paper as:

$$R_p^w = S_p/(1-T_p^2) \quad (5)$$

Note that through a similar argument it can be seen that $S_p$ corresponds to the reflectance of a sheet of paper with a black backing, and $(S_p+T_p^2)$ is the reflectance of a sheet of paper with a perfectly reflecting white backing. Also observe that substituting (5) in (3) a simpler expression is obtained for the reflectance of the show-through corrected image of page 1:

$$R_1(x,y) = T_1^2(x,y)(S_p + T_p^2 R_p^w) = T_1^2(x,y)R_p^w \quad (6)$$

Linearized Model of Show-Through

For reasons that will become clear later, it is advantageous to express Eq. 2 in normalized density space, where the normalized density is obtained as the negation of the logarithm of the normalized reflectance, obtained by dividing reflectance of the pixel with the reflectance for a pile of blank sheets:

$$\begin{aligned}D_1^s(x, y) &= -\ln(R_1^s(x, y)/R_p^w) \quad (7)\\ &= -\ln(T_1^2(x, y)) - \ln((S_p + T_p^2 T_2^2(x, y)R_3^s(x, y))/R_p^w)\\ &= -\ln(T_1^2(x, y)) - \ln(S_p/R_p^w + T_p^2 T_2^2(x, y)R_3^s(x, y)/R_p^w)\\ &= -\ln(T_1^2(x, y)) - \ln((1 - T_p^2) + T_p^2 T_2^2(x, y)R_3^s(x, y)/R_p^w)\\ &= -\ln(T_1^2(x, y)) - \ln((1 - T_p^2)[1 - T_2^2(x, y)R_3^s(x, y)/R_p^w])\\ &= D_1(x, y) - \ln\{1 - T_p^2[1 - T_2^2(x, y)T_3^s(x, y)]\}\end{aligned}$$

where 1n(.) denotes the natural logarithm, and $$D_1(x,y) = -1n(R_1(x,y)/R_p^w) = -1n(T_1^2(x,y)) \quad (8)$$

(see Eq. 6) is the normalized density for the show-through corrected image for page 1, and $$T_3^s(x,y) \equiv R_3^s(x,y)/R_p^w \quad (9)$$

is the normalized reflectance corresponding to the scan of page 3.

Since $T_p \ll S_p < 1$ and all other reflectance and transmittance terms in Eq. 7 are bounded between 0 and 1, we can see that $0 < T_p^2[1-T_2^2(x,y)T_3^s(x,y)] \ll 1$. Therefore, we can use the approximation: $1n(1-x) \approx -x$ for $|x| \ll 1$ in Eq. 7 with $x \equiv T_p^2[1-T_2^2(x,y)T_3^s(x,y)]$ to get:

$$\begin{aligned}D_1^s(x, y) &\approx D_1(x, y) + T_p^2[1 - T_2^2(x, y)T_3^s(x, y)] \quad (10)\\ &\approx D_1(x, y) + T_p^2 A_{23}^e(x, y)\end{aligned}$$

where $$A_{23}^e(x,y) \equiv [1 - T_2^2(x,y)T_3^s(x,y)] \quad (11)$$

Note that Eq. 10 states that the density corresponding to the scan of page 1 is the sum of the density for the show-through corrected image for page 1 and a show-through component that is equal to the effective absorptance $A_{23}^e(x,y)$ multiplied by the factor $T_p^2$.

Spreading in Paper and Show-Through Point Spread Function

The spatial spreading of light in the paper is neglected in the derivation of Eq. 10. The spreading of light in paper can be incorporated through a simple empirical modification by replacing the factor $T_p^2$ of Eq. 10 by a "show-through point spread function" H (x,y) to obtain $$D_1^s(x,y) = D_1(x,y) + H(x,y) * A_{23}^e(x,y) \quad (12)$$

where * denotes the spatial convolution operation.

Show-Through Correction

From Eq. 12 it is clear that if $D_1^s(x,y)$, $A_{23}^e(x,y)$ and $H(x,y)$ are known the density $D_1(x,y)$ for the show through corrected image can be recovered using the:

$$D_1(x,y) = D_1^s(x,y) - H(x,y) * A_{23}^e(x,y) \quad (12.1)$$

To see how the terms $D_1^s(x,y)$ and $A_{23}^e(x,y)$ can be obtained, first note that $R_p^w$ (the reflectance of a (thick) pile of blank sheets) can be estimated directly from the scans by averaging over margin areas in which there is no printing on any page (this is the reason why the normalized density was defined as in Eq. 7). $D_1^s(x,y)$ can then be obtained from the scanned reflectance $R_1^s(x,y)$ for page 1 using the relation (see Eq. 7):

$$D_1^s(x,y) = -1n(R_1^s(x,y)/R_p^w) \quad (13)$$

$A_{23}^e(x,y)$ can be estimated using Eq. 11, with the normalized reflectance $T_3^s(x,y)$ obtained from Eq. 10 by using the scanned reflectance $R_3^s(x,y)$ for page 3, and the transmittance $T_2(x,y)$ for the image layer on page 2 approximated as:

$$T_2^2(x,y) \approx R_2^s(x,y)/R_p^w \quad (14)$$

where $R_2^s(x,y)$ is the scanned reflectance for page 2. By considering an equation similar to Eq. 7 for the case scanning page 2, we can see that this approximation is obtained by neglecting the show-through in the scan of page 2. It can be readily seen that the error introduced in the show-through correction due to this approximation is of the order of $T_p^4$ and therefore usually negligible (note that the transmittance of paper, $T_p$, is quite small). If necessary, this approximation error may be further reduced by using an iterative approach in which the scanned reflectance in Eq. 14 above is replaced by the show-through corrected values from the last estimate.

Alignment and Show-Through Point Spread Function

In order to apply the show-through correction described by Eq. 12, one needs to know the show-through point-spread function H(x,y) and the relative alignment between the scans for pages 1, 2 and 3. Approximate alignment can be determined by detecting the edges of the pages, if any remaining alignment error does not vary over the page (i.e., there is no skew or other distortions) the theory of optimal linear filtering, for example as described in Simon Haykin, *Adaptive Filter Theory, Prentice Hall*, 1991, can be used to determine the point spread function from regions of the scan in which there is no printing on page 1 and corresponding regions of scans from page 2 and page 3. Alternately, if there are (small) variations in the alignment over the page, adaptive linear filters (for example, as described in Simon Haykin, *Adaptive Filter Theory, Prentice Hall*, 1991) can be used for the estimation of the show-through point spread function. If the relative alignment between the scans of pages 2 and 3 also varies over the page (as will normally be the case), two separate adaptive filters may be used and adapted independently, one representing the show-through due to page 2 (adapted and directly used in regions where there is printing in page 2 and no printing on pages 1 and 3) and another representing the show-through due to page 3 (adapted and directly used in regions where there is printing in page 3 and no printing on pages 1 and 2). In other regions, the filter coefficients can be used to "register" the images on pages 2 and 3 relative to each other and cancel show-through using estimated $A_{23}^e(x,y)$ and one of the filters.

The use of adaptive filters has a significant advantage over non-adaptive filters in that the registration of the front and back side images is not required to be extremely precise. As long as the filter sizes are reasonably large, they can adapt and compensate for small changes in the registration.

Note that one could potentially think of using the mode of Eq. 2 directly for the correction of show-through in reflectance space. However, the method would require perfect alignment of the images and a separate method of estimating the show-through point spread function. The use of density space provides a nice linear approximation to the problem allowing the use of theory from linear filtering in the estimation of the show-through point spread function, and also the use of adaptive filters which can significantly reduce the requirements for alignment.

Reflectance Data for Show-Through Correct Image

Once the density for the show-through corrected image for page 1 is obtained, reflectance corresponding to this show-through corrected image can be readily obtained as:

$$R_1(x,y)=R_p{}^w 1n(-D_1(x,y)) \qquad (15)$$

As noted earlier, $R_1(x,y)$ corresponds to the reflectance that would have been obtained if there were printing on page 1 alone and page 2 and the other pages forming the backing were blank (note there is no objectionable show-through in this case).

The show-through adjusted image data is stored in memory and may also be stored in the image data source 300 for later use in outputting the image using, for example, the image output device 400.

Figure 6:
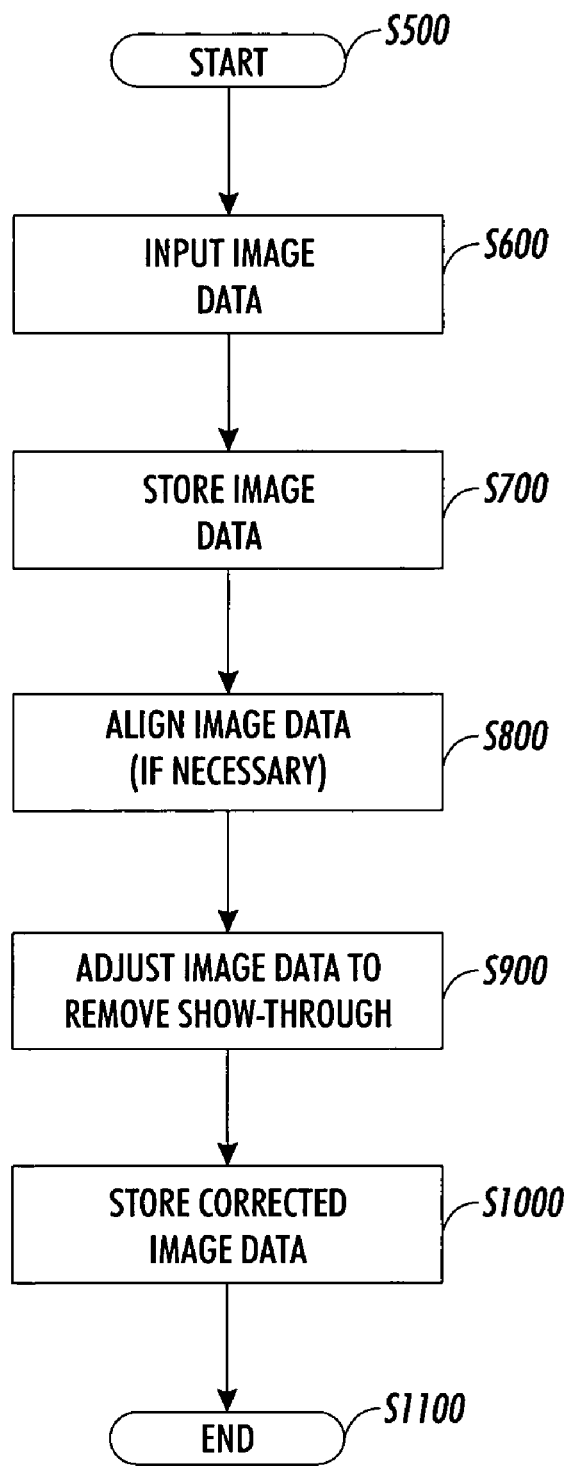
FIG. 6 is a flowchart outlining an exemplary method for adjusting detected image data to remove show-through image information according to this invention.

FIG. 6 is a flowchart outlining one exemplary embodiment of a method of compensating for show-through image information in image data. As shown in FIG. 6, beginning in step S500, control continues to step S600, where the image data is input. Next, in step S700, the image data is stored. Then, in step S800, if necessary, the image data is aligned. Control then continues to step S900.

In step S900, the image data is adjusted to remove any show-through image information. Then, in step S1000, the adjusted image data is stored. Next, in step S1100, the control routine ends.

Figure 7:
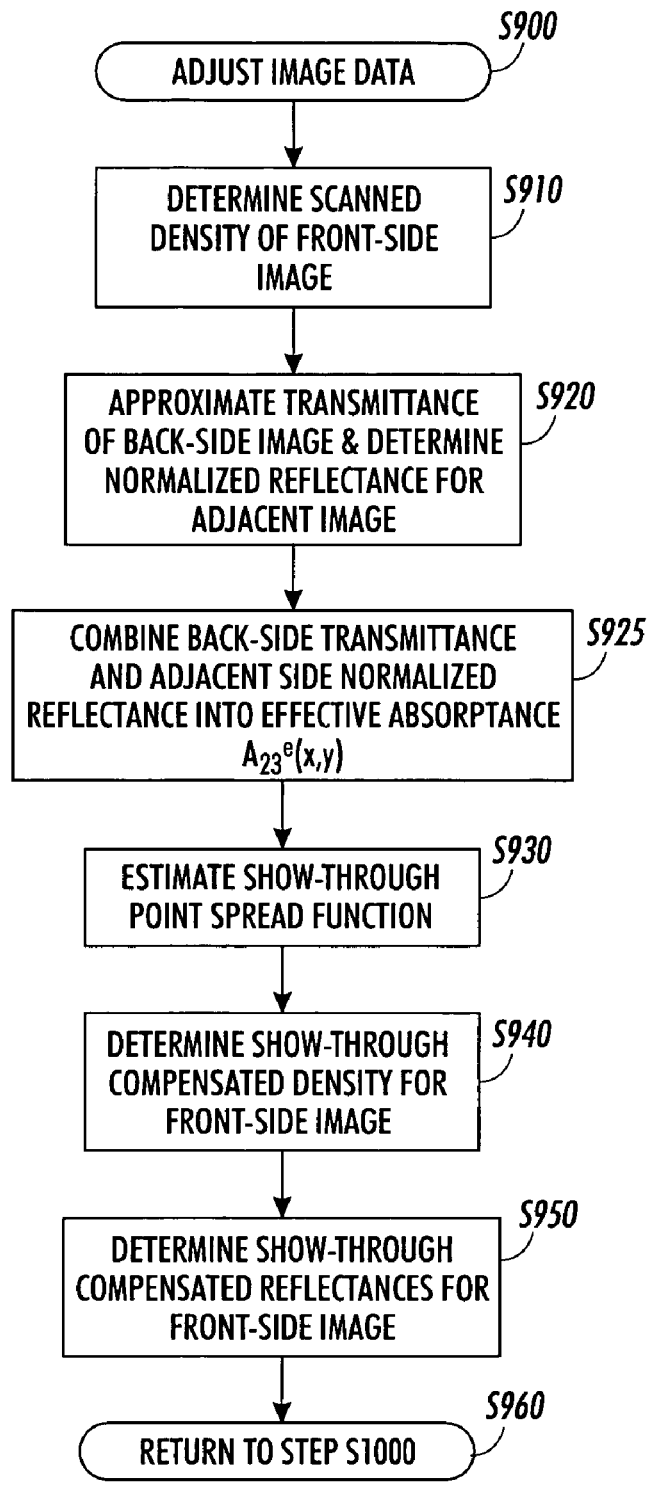
FIG. 7 is a flowchart outlining in greater detail one exemplary embodiment of the method for removing the show-through image information of step S900 of FIG. 6.

FIG. 7 is a flowchart outlining one exemplary embodiment of the method for adjusting the image data of step S900 of FIG. 6. As shown in FIG. 7, beginning in step S900, control continues to step S910, where the (spatially varying) scanned density of the front side of the image bearing substrates is determined based on the image data from the scanning of the pages. As described above, this may be done using the detected reflectances and the first line of Eq. 7 for the front side.

Next, in step S920, the approximate transmittance of the back side image and the normalized reflectance of the adjacent side image is determined from the scan data. This may be done, for example, using Eqs. 14 and 9. In step S925, the back side transmittance and the normalized reflectance of the adjacent side image are combined to obtain the effective absorptence of the combination. Eq. 11 may be used for this. Then, in step S930, the show-through point spread function of the image bearing substrate is estimated. As described above, this approximation may be performed automatically using linear prediction filters to approximate the show-through point spread function. Control then continues to step S940.

In step S940, density for show-through compensated front side of the image bearing substrate is determined from the scanned densities, the approximated absorbencies, and the estimated show-through point spread function. This may be done, for example using Eq. 12.1. Then, in step S950, show-through compensated reflectances for the front side image is computed, for example, by using Eq. 15. Next, in step S960, control returns to step S1000 in FIG. 6.

The above described equations may be applied to each pixel, group of pixels, and the like, of an image either through hardware, software, or a combination of hardware and software. The choice of hardware or software may depend on the speed and efficiency requirements of the system on which the show-through cancellation is implemented. Note also that for the conversion from reflectance to density the natural logarithm was used as an illustrative example in the description of the preferred embodiment, a logarithm to any other base may be used equally effectively, as the use of a different logarithm base only changes the "density" by a multiplicative factor. Furthermore, for the purposes of efficiency the functions for "density" and "absorptance" defined in this disclosure may be replaced by suitable equivalents or approximations that may be computed faster or evaluated using look-up tables. Also while the preferred embodiment has been described with reference to the scanning of black and white or grayscale images the invention is directly applicable to color images where the operations are performed on a perchannel basis. Additionally, it is understood that the entire images are not needed for the realization of the invention described herein and the show-through compensation may be employed by using buffers that make available required parts of the images on the three relevant pages.

As shown in FIGS. 1 and 2, the show-through image information removal device 200 may be implemented on a general purpose or special purpose computer. However, the show-through image information removal device 200 can also be implemented on a programmed microprocessor or microcontroller and peripheral integrated circuit elements, an ASIC or other integrated circuit, a hardware electronic or logic circuit such as a discrete element circuit, a programmable logic device such as a PLD, PLA, FPGA, or PAL, or the like. In general, any device on which a finite sate machine capable of implementing the flowcharts shown in FIGS. 6 and 7 can be used to implement the show-through image information removal device 200 of this invention.

While this invention has been described with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention. In particular, the different functions described herein may be approximated, for example, using look-up tables for efficient implementation.

What is claimed is:

1. A method of show-through image mitigation comprising:

placing a bound collection of duplex printed pages on an image scanning device;

scanning a facing page of the bound collection;

receiving image information comprising facing page image information, backside image information, and adjacent page image information;

scanning the adjacent page without the intervening facing page and backside image information;

determining scanned density data for the facing page substrate and effective absorbency data for the combined back and adjacent page information;

determining show-through compensated density data;

determining normalized reflectance data that is valid for an entire job by averaging over margin areas in which there is no printing on any page;

automatically transforming the show-through compensated density data for one or all of the images into show-through compensated reflectance image data that is valid for an entire job by coupling the normalized reflectance data with the show-through compensated density data; and, removing show-through image information based on the density and reflectance calculations, leaving only substantially the facing page image information.

2. The method of claim 1, wherein determining the show-through compensated density data includes:

spatially filtering the effective absorbency data for at least one of the back or adjacent images; and subtracting the spatially filtered absorbency data from the scanned density data for the front side image.

3. The method of claim 2, wherein the spatial filtering includes using a filter corresponding to a pre-determined show-through point spread function.

4. The method of claim 2, wherein the spatial filtering uses a filter corresponding to a show-through point spread function estimated from the scanned data for the three sides.

5. The method of claim 4, wherein the spatial filtering is performed using a digital filter.

6. The method of claim 5, wherein the digital filter is an adaptive filter.

7. The method of claim 1, wherein determining the scanned density data for the sides comprises determining a logarithm (or approximation thereof) of the ratio of the received image data for a region of the image bearing substrate containing an image and for a region of the image bearing substrate having no image on either the front or the back sides.

8. The method of claim 1, wherein the scanned density of the front side is determined using the relationship:

$$D_1^s(x,y) = -\ln(R_1^s(x,y)/R_p^w)$$

where ln( ) denotes the natural logarithm.

9. The method of claim 1, wherein the absorbency of the back and adjacent sides is approximated using the relationship:

$$A_{23}^e(x,y) \approx [1 - T_2^2(x,y)T_3^s(x,y)]$$

where $T_3^s(x,y)$ and $T_2^2(x,y)$ are obtained from the scanned data as $T_3^s(x,y) \approx R_3^s(x,y)/R_p^w$ and $T_2^2(x,y) \approx R_2^s(x,y)/R_p^w$.

10. The method of claim 1, wherein the show-through compensated density data is determined using the relationship:

$$D_1(x,y) = D_1^s(x,y) - H(x,y) * A_{23}^e(x,y).$$

11. A show-through image information removal apparatus for removing show-through image information from image data generated by scanning an image bearing substrate having a front side image and a back side image, wherein the substrate is adjacent a backing comprising an adjacent side image that shows through the image bearing substrate comprising:

an input/output interface;

a memory; and a show-through image information compensation device; wherein:

image data for the front side image, the back side image and the adjacent side image is received through the input/output interface and stored in the memory;

the show-through compensation device determines scanned density data for the substrate of the front-side image;

the show-through compensation device determines approximate absorbency data for the substrates on which the combination of the back and adjacent side images are printed from received image data for the front side image, the back side image and the adjacent side image that shows through the image bearing substrate; and, the show through compensation device determines show-through compensated density data for the substrate based on the scanned density data and the approximate absorbency data;

the show through compensation device determines normalized reflectance data that is valid for an entire job by averaging over margin areas in which there is no printing on any page;

the show through compensation device transforms the show-through compensated density data and the normalized reflectance data for one or all of the images into show-through compensated reflectance image data that is valid for an entire job.

12. The apparatus of claim 11, further comprising a data alignment circuit for aligning image data of the front, back and adjacent side images.

13. The apparatus of claim 12, wherein the show-through image information compensation device comprises:

means for determining scanned density data for the front side image from the received image data for the front side image;

means for approximating an absorbency of the combination of back and adjacent sides and estimating a show-through point spread function;

means for determining show-through compensated density data for the front side from the scanned density data, the approximated absorbencies and the estimated show-through point spread function.

14. The apparatus of claim 13, wherein the show-through correction is based on a linearized relationship between the image data for the front, back and adjacent sides.

15. The apparatus of claim 13, wherein the estimated show-through point-spread function is estimated using a digital filter.

16. The apparatus of claim 15, wherein the digital filter is an adaptive filter.

17. The apparatus of claim 13, wherein the show-through image information compensation device determines the scanned density data by determining a logarithm of a ratio of the received image data of a region having an image on the image bearing substrate and received image data of a region having no image on the image bearing substrate.

18. The apparatus of claim 11, wherein the normalized reflectance of the back side image is determined by the show-through image information compensation device using the relationship:

$$T_3^s(x,y) \approx R_3^s(x,y)/R_p^w.$$

19. The apparatus of claim 11, wherein the absorbency of the combination of back and adjacent sides is approximated by the show-through image information compensation device using the relationship:

$$A_{23}^e(x,y) \approx [1 - T_2^2(x,y)T_3^s(x,y)]$$

where $T_3^s(x,y)$ and $T_2^2(x,y)$ are obtained from the scanned data as $T_3^s(x,y) \approx R_3^s(x,y)/R_p^w$ and $T_2^2(x,y) \approx R_2^s(x,y)/R_p^w$.

20. The apparatus of claim 11, wherein the show-through image information compensation device determines show-through compensated density data by determining the show-through compensated density data using the relationship:

$$D_1(x,y) = D_1^s(x,y) - H(x,y) * A_{23}^e(x,y).$$

21. An image forming device including the show-through image information removal apparatus of claim 11.

* * * * *